(12) United States Patent
Park

(10) Patent No.: US 10,267,221 B2
(45) Date of Patent: Apr. 23, 2019

(54) COMBINED-CYCLE COMBUSTION CONTROL TYPE THREE-CYLINDER ENGINE AND METHOD FOR CONTROLLING THE SAME

(71) Applicant: HYUNDAI MOTOR COMPANY, Seoul (KR)

(72) Inventor: Min-Kyu Park, Suwon-si, Gyeonggi-do (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 677 days.

(21) Appl. No.: 14/954,755

(22) Filed: Nov. 30, 2015

(65) Prior Publication Data

US 2017/0074162 A1    Mar. 16, 2017

(30) Foreign Application Priority Data

Sep. 11, 2015 (KR) .................. 10-2015-0128848

(51) Int. Cl.
*F02B 75/02* (2006.01)
*F02B 75/18* (2006.01)
(Continued)

(52) U.S. Cl.
CPC .............. *F02B 75/02* (2013.01); *F01L 1/053* (2013.01); *F01L 1/181* (2013.01); *F01L 1/38* (2013.01);
(Continued)

(58) Field of Classification Search
CPC .......... F02B 75/02; F02B 75/20; F02B 75/18; F02B 2075/027; F02B 2075/1812; F02B 2075/025; F01L 1/181; F01L 1/053; F01L 1/38; F01L 1/26; F01L 1/20; F01L 2710/003; F01L 2250/02; F01L 2250/04; F01L 2001/0535; F01L 2810/03;
(Continued)

(56) References Cited

U.S. PATENT DOCUMENTS 1,601,548 A * 9/1926 Zier .......................... F02B 1/00
                                                                    123/58.1
4,159,699 A * 7/1979 McCrum ................. F02B 41/06
                                                                    123/1 R
(Continued)

FOREIGN PATENT DOCUMENTS

JP        07-158544 A    6/1995
JP     2000-170545 A    6/2000
(Continued)

*Primary Examiner* — Grant Moubry
(74) *Attorney, Agent, or Firm* — Morgan Lewis & Bockius LLP

(57) ABSTRACT

A combined-cycle combustion control type three-cylinder engine includes: a cylinder block; and cylinders arranged in a row in the cylinder block and consisting of first, second, and third cylinders so that four-cycle combustion is performed in two of the first, second, and third cylinders and two-cycle combustion is performed in the remaining cylinder. A crankshaft is provided in first, second, and third pistons and converting reciprocating motions of the respective first, second, and third cylinders into rotational motions. A camshaft receives a rotational force from the crankshaft to control intake and exhaust timings for each of the first, second, and third cylinders.

18 Claims, 12 Drawing Sheets

(51) Int. Cl.
*F02B 75/20* (2006.01)
*F01L 1/38* (2006.01)
*F16C 3/06* (2006.01)
*F02D 41/30* (2006.01)
*F02D 13/02* (2006.01)
*F01L 1/053* (2006.01)
*F01L 1/18* (2006.01)
*F02D 41/00* (2006.01)
*F01L 1/20* (2006.01)
*F01L 1/26* (2006.01)

(52) U.S. Cl.
CPC .............. *F02B 75/18* (2013.01); *F02B 75/20* (2013.01); *F02D 13/02* (2013.01); *F02D 41/0002* (2013.01); *F02D 41/3058* (2013.01); *F01L 1/20* (2013.01); *F01L 1/26* (2013.01); *F01L 2001/0535* (2013.01); *F01L 2250/02* (2013.01); *F01L 2250/04* (2013.01); *F01L 2710/003* (2013.01); *F01L 2800/08* (2013.01); *F01L 2810/03* (2013.01); *F02B 2075/025* (2013.01); *F02B 2075/027* (2013.01); *F02B 2075/1812* (2013.01); *F02D 41/009* (2013.01); *F02D 2041/001* (2013.01); *F02D 2400/02* (2013.01); *F02D 2400/04* (2013.01); *F16C 3/06* (2013.01); *F16C 2360/22* (2013.01); *Y02T 10/42* (2013.01)

(58) Field of Classification Search
CPC .............. F01L 2800/08; F02D 41/0002; F02D 41/3058; F02D 13/02; F02D 2400/02; F02D 2400/04; F02D 2041/001; F16C 3/06; F16C 2360/22
See application file for complete search history.

(56) References Cited

U.S. PATENT DOCUMENTS

| | | | | |
|---|---|---|---|---|
| 5,072,589 | A | * 12/1991 | Schmitz | F02B 41/08 123/560 |
| 5,265,564 | A | * 11/1993 | Dullaway | F02B 33/22 123/560 |
| 5,566,549 | A | * 10/1996 | Clarke | F02B 41/06 60/620 |
| 6,318,310 | B1 | 11/2001 | Clarke | |
| 8,091,521 | B2 * | 1/2012 | Park | F02B 75/12 123/316 |
| 8,904,987 | B2 * | 12/2014 | Gebeau | F02B 33/22 123/193.3 |
| 9,574,502 | B1 * | 2/2017 | Fluhler | F02D 15/00 |
| 2008/0168957 | A1 * | 7/2008 | Neese | F02B 61/02 123/54.4 |
| 2009/0056670 | A1 * | 3/2009 | Zhao | F02B 41/06 123/25 P |
| 2011/0005500 | A1 * | 1/2011 | Asari | F01L 1/02 123/508 |
| 2011/0265760 | A1 * | 11/2011 | Park | F02B 75/225 123/403 |
| 2013/0000589 | A1 | 1/2013 | Roehrig | |

FOREIGN PATENT DOCUMENTS

| | | |
|---|---|---|
| JP | 2001-214751 A | 8/2001 |
| JP | 2010-048087 A | 3/2010 |
| JP | 2015-059565 A | 3/2015 |
| KR | 10-2005-0080086 A | 8/2005 |

* cited by examiner

CROSS-SECTION OF A-A

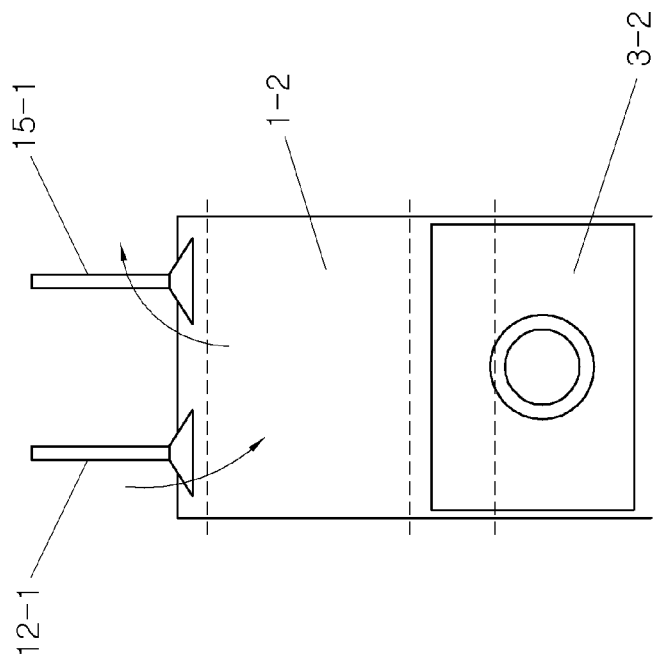
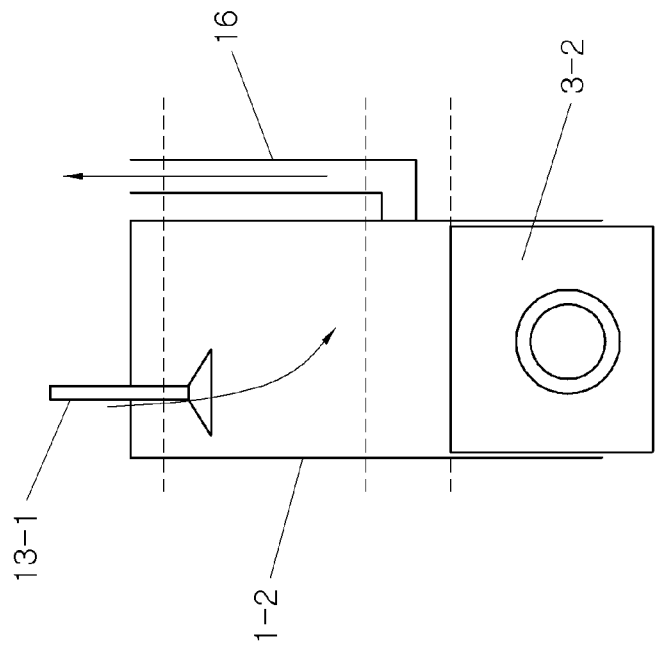

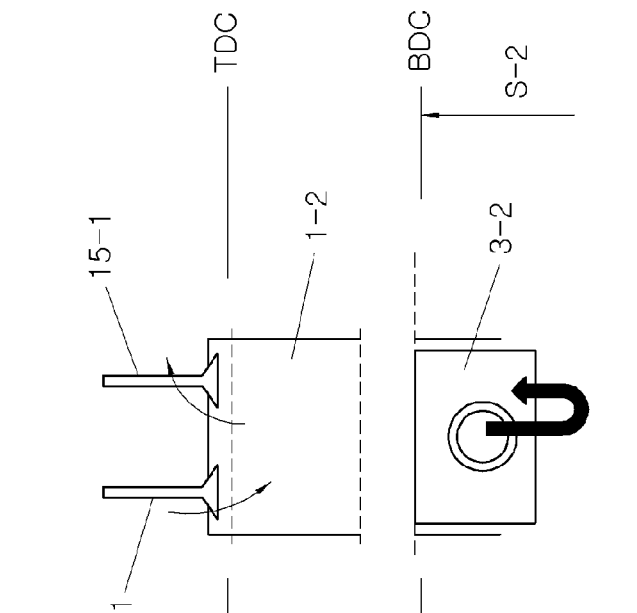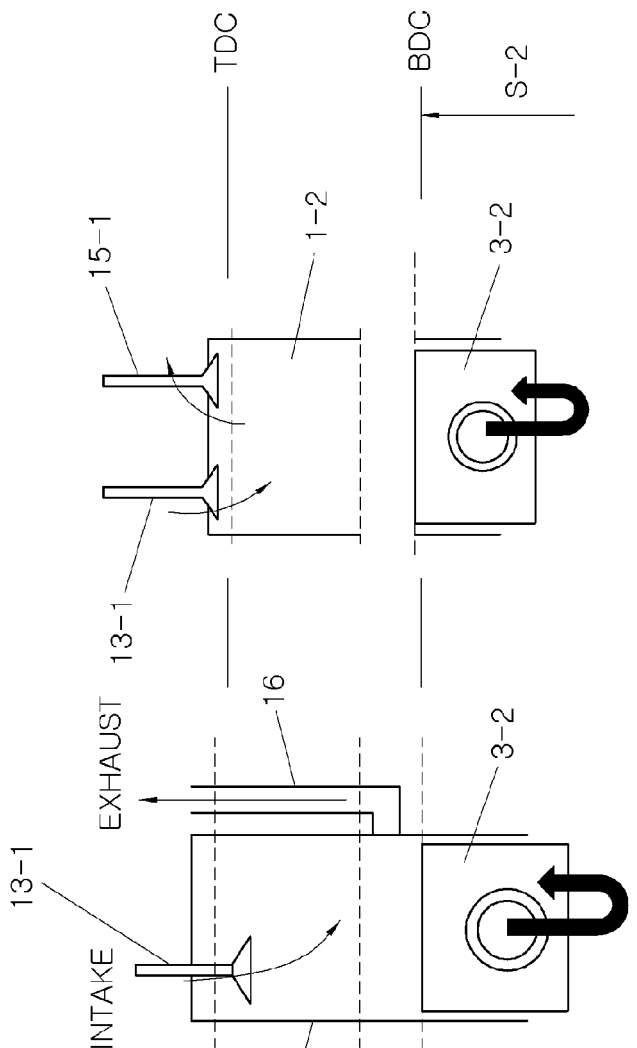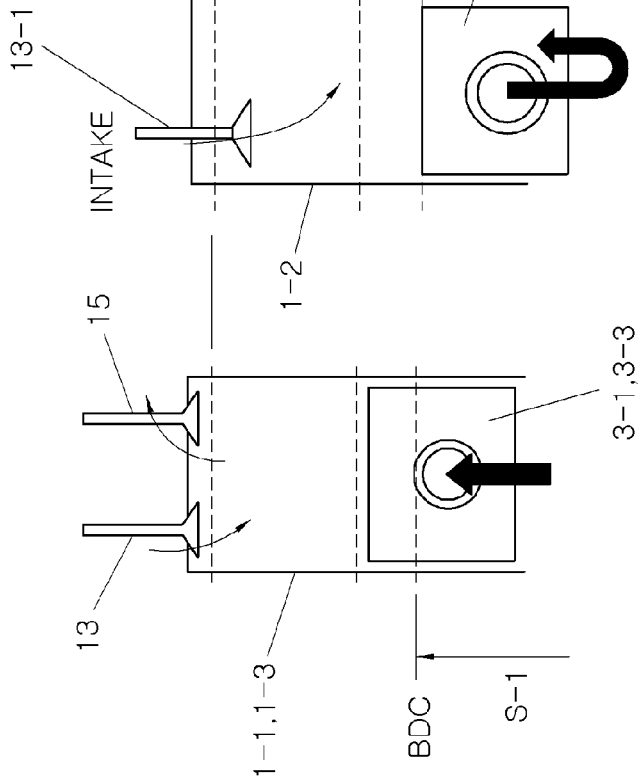

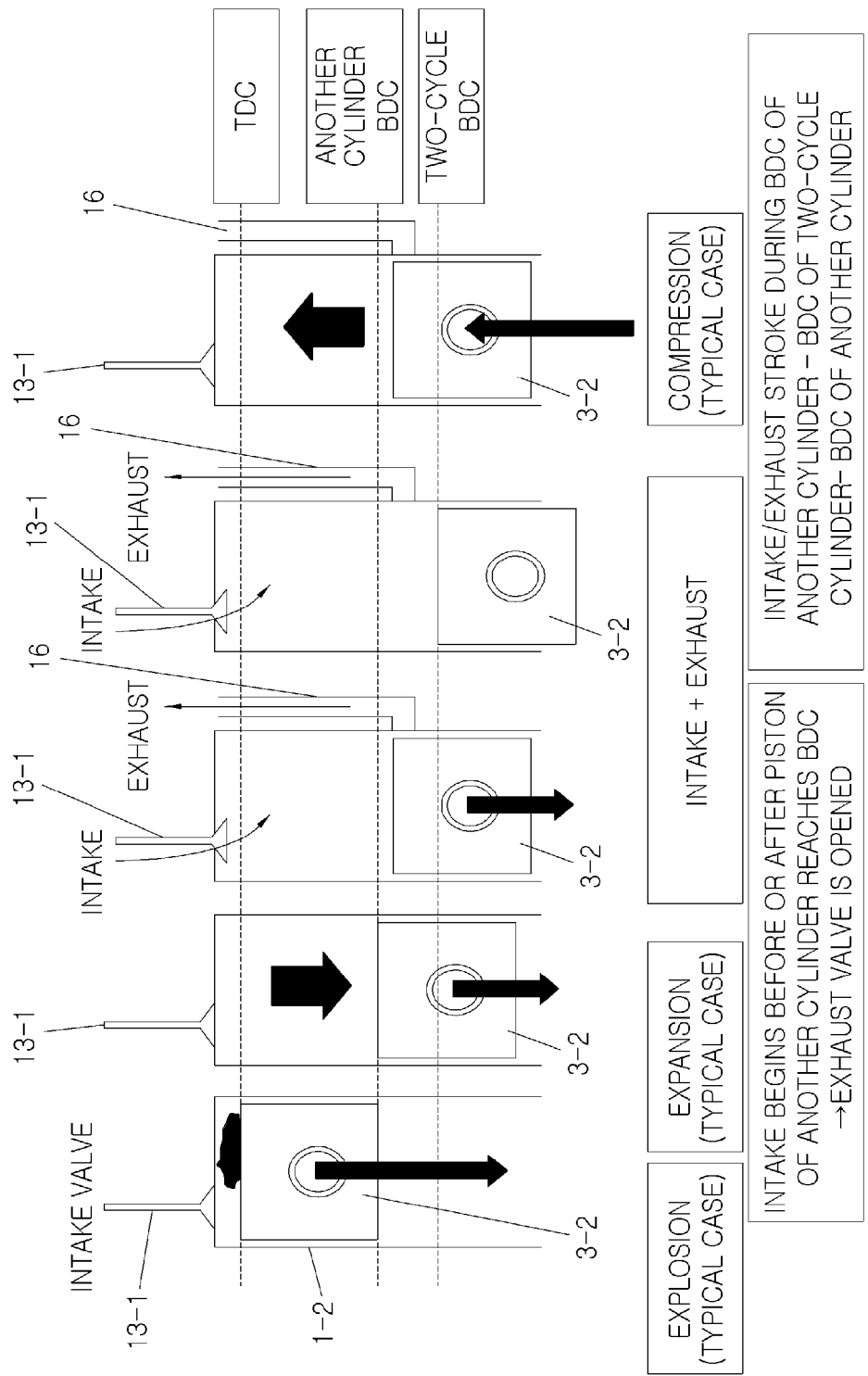

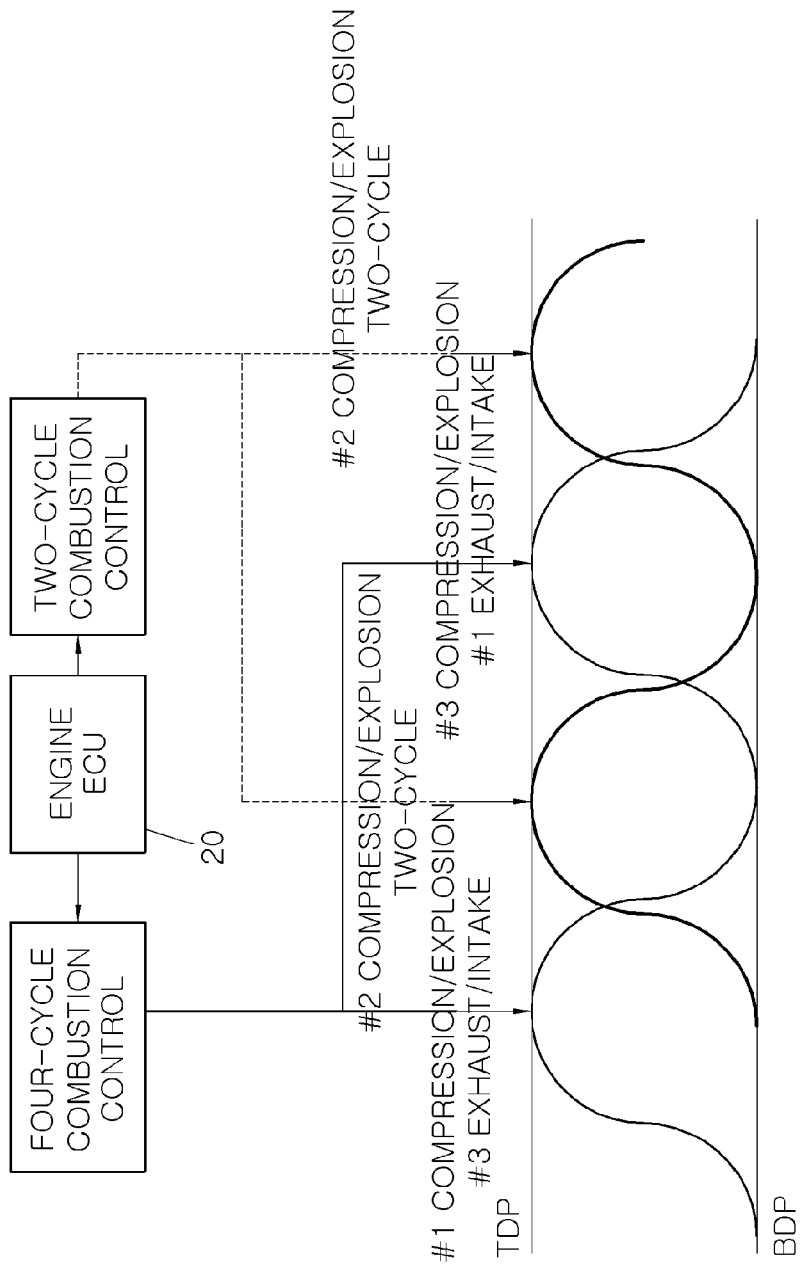

COMBINED-CYCLE COMBUSTION CONTROL TYPE THREE-CYLINDER ENGINE AND METHOD FOR CONTROLLING THE SAME

CROSS-REFERENCE TO RELATED APPLICATION

This application claims the benefit of priority to Korean Patent Application No. 10-2015-0128848, filed on Sep. 11, 2015, which is incorporated herein by reference in its entirety.

TECHNICAL FIELD

The present disclosure relates to a three-cylinder engine, and more particularly, to a combined-cycle combustion control type three-cylinder engine which has a compact structure, high fuel efficiency, and improved noise, vibration, and harshness (NVH) while being operated as two- and four-cycle combustion cylinders, and a method for controlling the same.

BACKGROUND

In recent years, three-cylinder engines are manufactured in order to overcome limitations of four-cylinder four-cycle combustion engines about improvement in fuel efficiency, an engine size, a reduction in weight, etc.

In terms of configuration, a three-cylinder engine consists of three cylinders, each of which has the same bore, stroke, and valve timing. The three cylinders of the three-cylinder engine include various devices required for combustion, as in four-cylinder engines. The intake/exhaust timing during combustion in each cylinder is controlled by an engine electronic control unit (ECU).

The three-cylinder engine applies a four-cycle combustion process of intake-compression-explosion-exhaust, or a two-cycle combustion process of intake/exhaust-compression/explosion.

The three-cylinder engine is controlled by a single cycle combustion process in which all of the three cylinders are controlled by a four-cycle combustion process, or two of the three cylinders are controlled by a four-cycle combustion process.

However, since the three-cylinder engine has structural characteristics in which bores, strokes, and valve timings of the respective cylinders are equal to one another, the engine generates noise and vibration compared to typical four or more cylinder engines. To resolve this, it is necessary to devise a design technique for three-cylinder engines in which a three-cylinder engine combines a four-cycle with a two-cycle. In addition, since engine performance (for example, power and torque) is deteriorated when this combined cycle engine is controlled, merchantable quality of the engine may be lowered.

The deterioration of NVH and engine performance is caused because the two- and four-cycle combustion cylinders have the same displacement even though the two-cycle engine has poor combustion efficiency compared to the four-cycle engine.

SUMMARY

The present disclosure is directed to a combined-cycle combustion control type three-cylinder engine which allows a bore, a stroke, and a valve timing of a two-cycle cylinder to differ from those of a four-cycle cylinder during combustion control such that the same power is generated in the two- and four-cycle cylinders, thereby preventing engine performance (power and torque) from deteriorating when the three-cylinder engine is operated under the combined four- and two-cycle, particularly while the advantages of existing three-cylinder engines, such as a compact structure and high fuel efficiency, are maintained and noise, vibration, and harshness (NVH) is further improved, and a method of controlling the same.

Other objects and advantages of the present disclosure can be understood by the following description, and become apparent with reference to the embodiments. It is obvious to those skilled in the art to which the present disclosure pertains that the objects and advantages of the present invention can be realized by the means as claimed and combinations thereof.

In accordance with an embodiment in the present disclosure, a combined-cycle combustion control type three-cylinder engine includes a cylinder block; cylinders arranged in a row in the cylinder block and consisting of first, second, and third cylinders so that four-cycle combustion is performed in two of the first, second, and third cylinders and two-cycle combustion is performed in the remaining cylinder. A crankshaft converts reciprocating motions of first, second, and third pistons, provided in the respective first, second, and third cylinders into rotational motions. A camshaft receives rotational force from the crankshaft to control intake and exhaust timings for each of the first, second, and third cylinders.

The four-cycle combustion may be performed in each of the first and third cylinders, and the two-cycle combustion may be performed in the second cylinder.

The second piston provided in the second cylinder may have a stroke shorter than a stroke of the first piston provided in the first cylinder and a stroke of the third piston provided in the third cylinder. The first, second, and third pistons may be respectively coupled to first, second, and third crankpin journals of the crankshaft. A main journal of the crankshaft may include first, second, and third counter weights which are arranged at intervals, the first, second, and third counter weights may have the first, second, and third crankpin journals, respectively, and the second crankpin journal may be formed at a higher position than the first and third crankpin journals with respect to an axis of rotation of the main journal. The first, second, and third pistons have different strokes due to a difference in height between the respective first, second, and third crankpin journals.

The first crankpin journal and the third crankpin journal may have the same height.

The camshaft may include two four-cycle cams for controlling the intake and exhaust timings of the first and third cylinders, and one two-cycle cam for controlling the intake and exhaust timings of the second cylinder. The two-cycle cam may have an elliptical shape so as to be bilaterally symmetrical about an axis of rotation of the camshaft.

Each of the first and third cylinders may include a four-cycle cylinder intake valve and a four-cycle cylinder exhaust valve, timings of which are controlled by each of the four-cycle cams. The second cylinder may include a two-cycle cylinder intake valve, a timing of which is controlled by the two-cycle cam, and a two-cycle cylinder exhaust port, a timing of which is controlled by downward movement of the second piston. The two-cycle cylinder exhaust port may communicate with an inner portion of a combustion chamber of the second cylinder at a side of the second cylinder.

Each of the first and third cylinders may include a four-cycle cylinder intake valve and a four-cycle cylinder exhaust valve, timings of which are controlled by each of the four-cycle cams. The second cylinder may include a two-cycle cylinder intake valve and a two-cycle cylinder exhaust valve, timings of which are controlled by the two-cycle cam.

The camshaft may be combined with a variable valve system.

The four-cycle combustion and the two-cycle combustion may be controlled by a controller, and the controller may control intake and exhaust timings for the two-cycle combustion using bottom dead centers (BDCs) detected by the respective first, second, and third pistons. The controller may be an engine electronic control unit (ECU).

In accordance with another embodiment in the present disclosure, a method of controlling a combined-cycle combustion control type three-cylinder engine includes performing combined-cycle combustion consisting of four-cycle combustion performed in first and third cylinders of first, second, and third cylinders, and two-cycle combustion performed in the second cylinder, when an engine ECU recognizes ignition of the engine, and performing combined-cycle combustion control in which, when the engine ECU controls the four-cycle combustion in the first and third cylinders and the two-cycle combustion in the second cylinder, intake valve open (IVO) of the second cylinder is controlled before or after a piston of the first or third cylinder reaches a BDC, and intake valve close (IVC) of the second cylinder is controlled when the piston of the first or third cylinder reaches the BDC.

In accordance with another embodiment in the present disclosure, a method of controlling a combined-cycle combustion control type three-cylinder engine includes performing combined-cycle combustion consisting of four-cycle combustion performed in first and third cylinders of first, second, and third cylinders, and two-cycle combustion performed in the second cylinder, when an engine ECU recognizes ignition of the engine, and performing combined-cycle combustion control in which, when the engine ECU controls the four-cycle combustion in the first and third cylinders and the two-cycle combustion in the second cylinder, IVO of the second cylinder is controlled when a piston of the first or third cylinder reaches a BDC, exhaust valve open (EVO) of the second cylinder is controlled after the control of the IVO, and IVC and exhaust valve close (EVC) of the second cylinder are simultaneously controlled before or after the piston of the first or third cylinder reaches the BDC.

In accordance with a further embodiment in the present disclosure, a method of controlling a combined-cycle combustion control type three-cylinder engine includes performing combined-cycle combustion consisting of four-cycle combustion performed in first and third cylinders of first, second, and third cylinders, and two-cycle combustion performed in the second cylinder, when an engine ECU recognizes ignition of the engine, performing two-cycle cylinder determination in which the engine ECU determines whether the second cylinder has a two-cycle cylinder exhaust valve, performing first type combined-cycle combustion control in which, when the engine ECU controls the four-cycle combustion in the first and third cylinders and the two-cycle combustion in the second cylinder without having the two-cycle cylinder exhaust valve, IVO of the second cylinder is controlled before or after a piston of the first or third cylinder reaches a BDC, and IVC of the second cylinder is controlled when the piston of the first or third cylinder reaches the BDC, and performing second type combined-cycle combustion control in which, when the engine ECU controls the four-cycle combustion in the first and third cylinders and the two-cycle combustion in the second cylinder having the two-cycle cylinder exhaust valve, IVO of the second cylinder is controlled when a piston of the first or third cylinder reaches a BDC, EVO of the second cylinder is controlled after the control of the IVO, and IVC and EVC of the second cylinder are simultaneously controlled before or after the piston of the first or third cylinder reaches the BDC.

The second cylinder may include a two-cycle cylinder intake valve in which the IVO control and the IVC control are performed, and a two-cycle cylinder exhaust port which is opened when a piston is close to a BDC and is closed when the piston is close to the BDC of the first or third cylinder, or the second cylinder may include a two-cycle cylinder intake valve in which the IVO control and the IVC control are performed, and a two-cycle cylinder exhaust valve in which the EVO control and the EVC control are performed.

BRIEF DESCRIPTION OF THE DRAWINGS

FIGS. 6A and 6B are views illustrating a configuration of a two-cycle cylinder intake/exhaust valve mechanism according to the embodiment in the present disclosure.

FIGS. 7A-7C are views illustrating a comparison between strokes of four- and two-cycle cylinders according to the embodiment of the present invention.

FIG. 9 is a diagram illustrating a state of intake/exhaust operation during combustion in a first type two-cycle cylinder according to the embodiment of the present invention.

FIG. 11 is a diagram illustrating a combined-cycle combustion timing during four- and two-cycle combustion of the three-cylinder engine according to the embodiment of the present invention.

DETAILED DESCRIPTION

Figure 1:
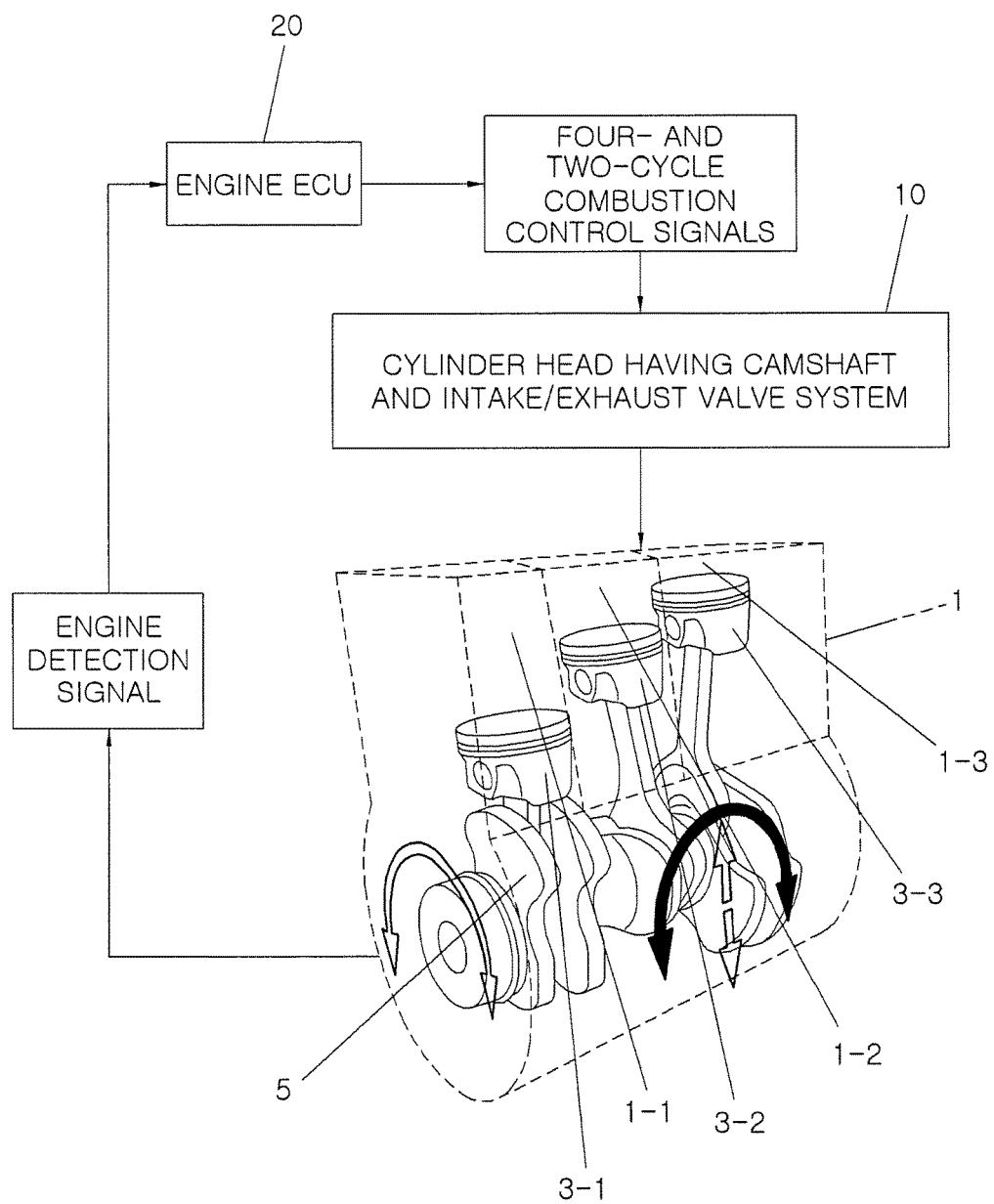
FIG. 1 is a diagram illustrating a configuration of a combined-cycle combustion control type three-cylinder engine according to an embodiment in the present disclosure.

The present disclosure will be described below in more detail with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Throughout the disclosure, like reference numerals refer to like parts throughout the various figures and embodiments.

FIG. 1 is a diagram illustrating a combined-cycle combustion control type three-cylinder engine according to an embodiment in the present disclosure.

Referring to FIG. 1, a three-cylinder engine includes: a cylinder block 1; first, second, and third cylinders 1-1, 1-2, and 1-3; first, second, and third pistons 3-1, 3-2, and 3-3; a crankshaft 5; a cylinder head 10; and a controller 20.

The cylinder block 1 comprises a cylinder body which forms the first, second, and third cylinders 1-1, 1-2, and 1-3. The crankshaft 5 is located at a cylinder body lower portion. The cylinder body comprises an engine coolant circulation structure, and the cylinder body lower portion forms a space for storing engine oil. The cylinder block 1 further includes engine auxiliary components, such as a water pump, a compressor, etc., which receive a rotational force of the crankshaft 5.

The first and third cylinders 1-1 and 1-3 form a four-cycle combustion chamber, and the second cylinder 1-2 forms a two-cycle combustion chamber. The second cylinder 1-2 is located between the first and third cylinders 1-1 and 1-3.

Each of the first, second, and third pistons 3-1, 3-2, and 3-3 has a con rod (i.e., a connecting rod) having a small end portion attached to the associated piston and a large end portion attached to the crankshaft 5. A piston stroke is formed by a length between the small and large end portions of the con rod. For example, each of the con rods of the first and third pistons 3-1 and 3-3 forms a piston stroke for four-cycle, and the con rod of the second piston 3-2 forms a piston stroke for two-cycle. Therefore, the length of the con rod of the second piston 3-2 is relatively shorter than the lengths of the con rods of the first and third pistons 3-1 and 3-3.

The crankshaft 5 is connected to all of the first, second, and third pistons 3-1, 3-2, and 3-3 through the con rods, and converts the reciprocating motions of the first, second, and third pistons 3-1, 3-2, and 3-3 into rotational motions.

The cylinder head 10 includes a camshaft and a valve system, and is coupled to an upper portion of the cylinder block 1. The camshaft receives the rotational force of the crankshaft 5 using a timing belt or a chain.

The controller 20 receives information on rotation of the crankshaft 5 and a state of operation of the three-cylinder engine, to operate the valve system and generate four- and two-cycle timing control signals. Particularly, the controller 20 controls combustion in the second cylinder 1-2 according to a two-cycle timing while controlling combustion in the first and third cylinders 1-1 and 1-3 according to four-cycle timings, or controls combustion in either the first and third cylinders 1-1 and 1-3 of the first, second, and third cylinders 1-1, 1-2, and 1-3 according to a two-cycle timing. The controller 20 may be an engine electronic control unit (ECU) or any other controller. Particularly, an engine ECU for four-cycle is used as the engine ECU, and thus, four-cycle combustion control logic and configurations may be used by adding or changing only two-cycle combustion control logic and configurations.

FIGS. 2 to 6B illustrate detailed configurations of a crankshaft, a camshaft, a variable valve system, a four-cycle cylinder valve mechanism, and a two-cycle cylinder valve mechanism, respectively.

Figure 2:
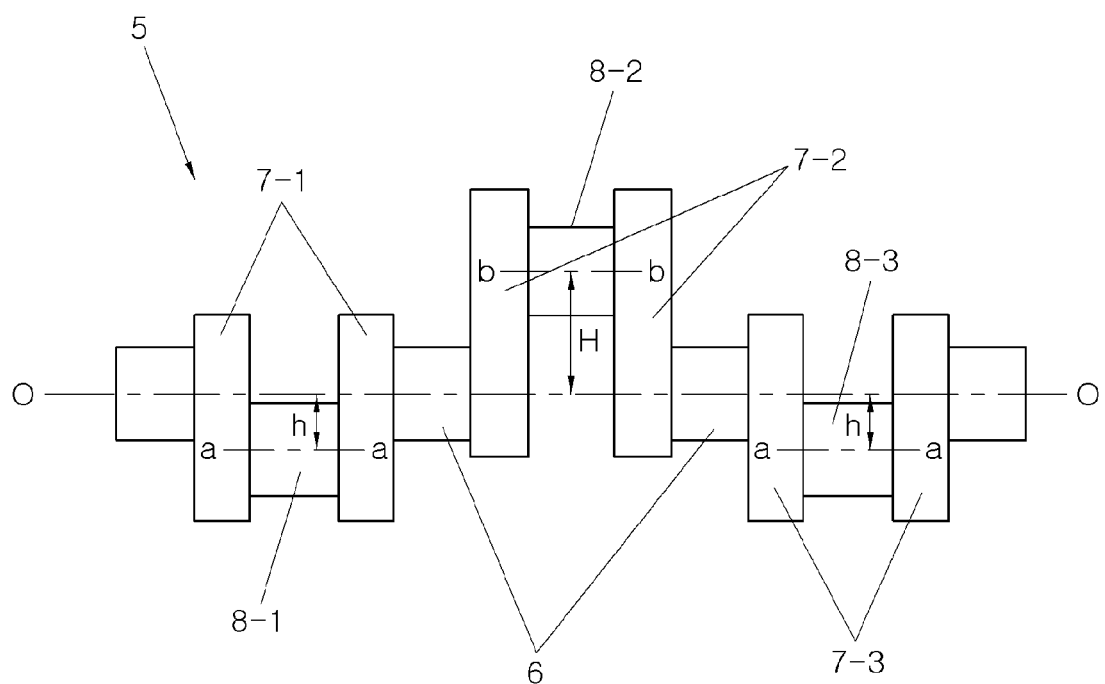
FIG. 2 is a view illustrating a configuration of a crankshaft according to the embodiment in the present disclosure.

Referring to FIG. 2, the crankshaft 5 includes a main journal 6, counter weights 7-1, 7-2, and 7-3, and crankpin journals 8-1, 8-2, and 8-3, and rotates by reciprocating motions of the first, second, third pistons 3-1, 3-2, and 3-3.

The main journal 6 has a front end portion to which a crank pulley is mounted, and a rear end portion to which a flywheel is fastened. The main journal 6 is supported by the cylinder block 1, and supplies lubrication oil to the crankpin journals 8-1, 8-2, and 8-3 and bearings through a passage formed therein.

The counter weights 7-1, 7-2, and 7-3 reduce vibration due to rotation using the weight and shape thereof, and consist of first, second and third counter weights 7-1, 7-2, and 7-3 which are formed at intervals. Each of the first, second and third counter weights 7-1, 7-2, and 7-3 is formed as a pair of counter weights which face each other. For example, the first counter weight 7-1 is located at the front end portion of the main journal 6, the third counter weight 7-3 is located at the rear end portion of the main journal 6, and the second counter weight 702 is located between the first and third counter weights 7-1 and 7-3.

The crankpin journals 8-1, 8-2, and 8-3 consist of a first crankpin journal 8-1 provided in the first counter weight 7-1, a second crankpin journal 8-2 provided in the second counter weight 7-2, and a third crankpin journal 8-3 provided in the third counter weight 7-3. The first crankpin journal 8-1 is coupled to the large end portion of the con rod so as to convert the reciprocating motion of the first piston 3-1 coupled to the small end portion into a rotational motion. The second crankpin journal 8-2 is coupled to the large end portion of the con rod so as to convert the reciprocating motion of the second piston 3-2 coupled to the small end portion into a rotational motion. The third crankpin journal 8-3 is coupled to the large end portion of the con rod so as to convert the reciprocating motion of the third piston 3-3 coupled to the small end portion into a rotational motion.

When height h is formed by axis of rotation a-a of each of the first and third crankpin journals 8-1 and 8-3 and axis of rotation o-o of the main journal 6, height H is formed by axis of rotation b-b of the second crankpin journal 8-2 and axis of rotation o-o of the main journal 6. Here, the height H is larger than the height h. Therefore, the stroke of the second piston 3-2, which is connected to the second crankpin journal 8-2 through the con rod, is shorter than each stroke of the first and third pistons 3-1 and 3-3 which are respectively connected to the first and third crankpin journals 8-1 and 8-3 through the con rods. As a result, the length of the con rod which connects the second crankpin journal 8-2 to the second piston 3-2 may be shortened that much.

Figure 3A:
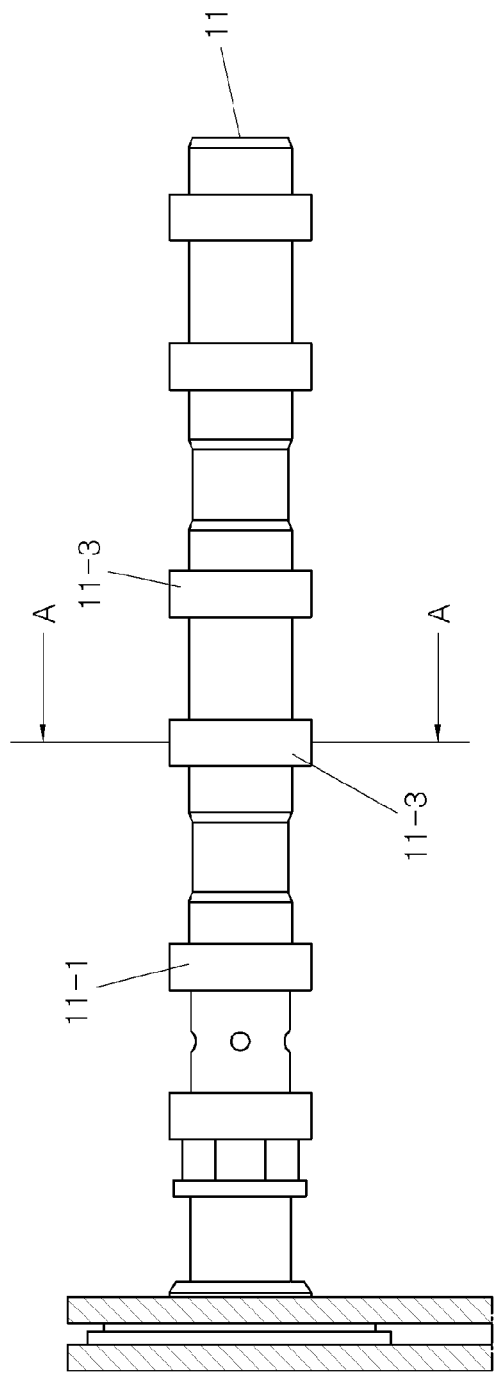
FIGS. 3A and 3B are views illustrating a configuration of a camshaft according to the embodiment in the present disclosure.
Figure 3B:
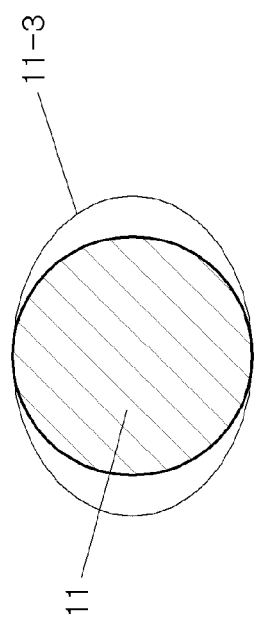

Referring to FIGS. 3A and 3B, the camshaft 11 receives the rotational force of the crankshaft 5 using the timing belt or the chain, and is formed in a long shaft shape having a circular cross-section. The camshaft 11 has a plurality of cams 11-1, 11-2, and 11-3 for opening and closing intake/exhaust valves. Specifically, the cams 11-1, 11-2, and 11-3 consist of four-cycle cams 11-1 and 11-3 for opening and closing the intake/exhaust valves of the first and third cylinders 1-1 and 1-3, and a two-cycle cam 11-2 for opening and closing the intake/exhaust valve of the second cylinder 1-2. The two-cycle cam 11-2 is located between the two four-cycle cams 11-1 and 11-3. The two-cycle cam 11-2 has an elliptical shape and is bilaterally symmetrical about the axis of rotation of the camshaft 11, and thus the valve timing is controlled independently.

Figure 4:
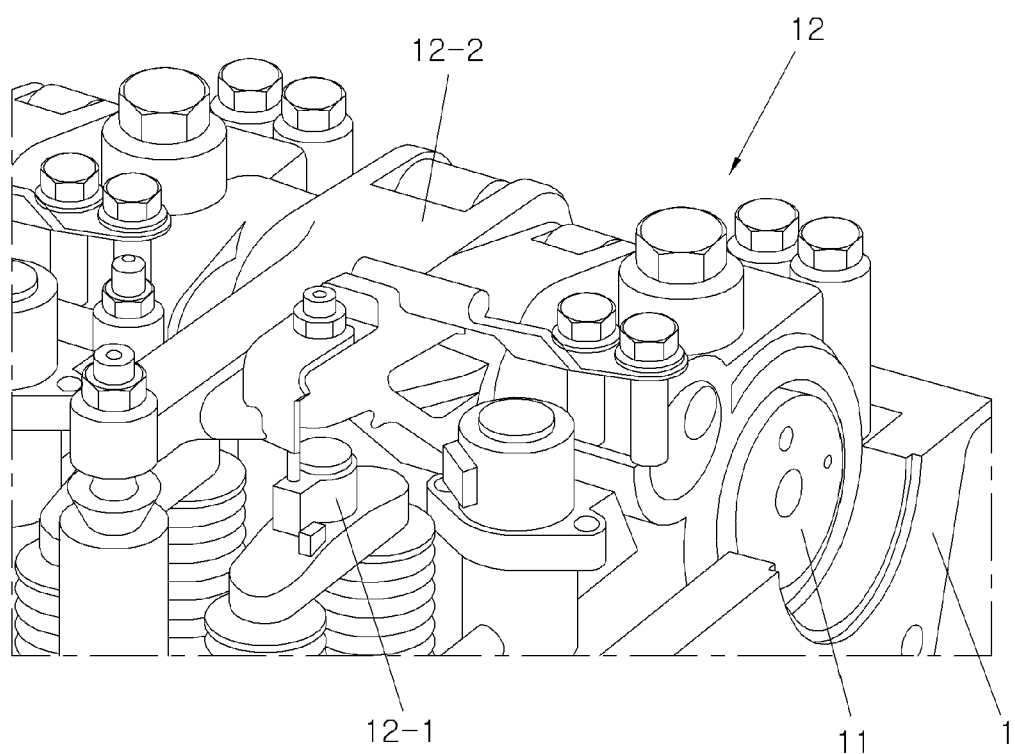
FIG. 4 is a view illustrating a configuration of a variable valve system according to the embodiment in the present disclosure.

The camshaft 11 is integrated with the variable valve system 12, and thus may be connected to various variable valve mechanisms for independent control of the valve timing. FIG. 4 illustrates an example of the camshaft 11 and the variable valve system 12 having a variable valve device 12-1 connected to a rocker arm 12-2.

Figure 5:
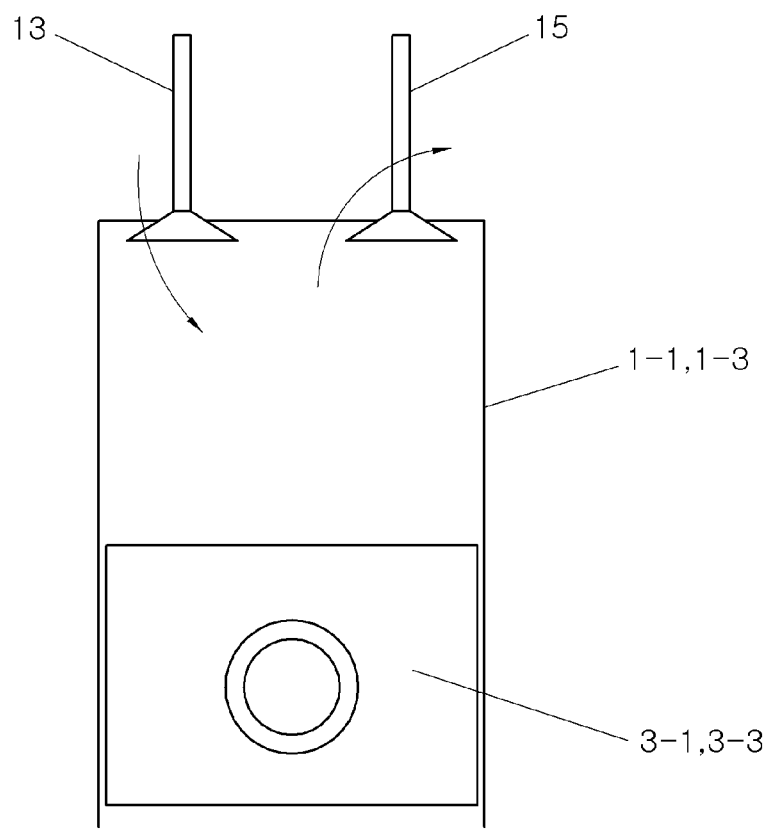
FIG. 5 is a view illustrating a configuration of a four-cycle cylinder intake/exhaust valve mechanism according to the embodiment in the present disclosure.

Referring to FIG. 5, the four-cycle cylinder valve mechanism includes a four-cycle cylinder intake valve 13 and a four-cycle cylinder exhaust valve 15, which are respectively opened and closed by the four-cycle cams 11-1 and 11-3 of the camshaft 11 within the cylinder head 10, and is operated according to the four-cycle timings of the first and third cylinders 1-1 and 1-3. Therefore, the four-cycle cylinder intake/exhaust valves 13 and 15 have the same structure and operation as the intake/exhaust valves of typical four-cylinder engines.

Referring to FIGS. 6A and 6B, the two-cycle cylinder valve mechanism consists of a first type two-cycle cylinder valve mechanism which includes a two-cycle cylinder intake valve 13-1 and a two-cycle cylinder exhaust port 16, or a second type two-cycle cylinder valve mechanism which includes a two-cycle cylinder intake valve 13-1 and a two-cycle cylinder exhaust valve 15-1.

The first type two-cycle cylinder valve mechanism includes the two-cycle cylinder intake valve 13-1 which is located in the cylinder heat 10 to be opened and closed by the two-cycle cam 11-2 of the camshaft 11, and the two-cycle cylinder exhaust port 16 through which exhaust gas is discharged by a variation in position of the second piston 3-2 according to the downward movement thereof in the state in which it is not related to the camshaft 11. The first type two-cycle cylinder valve mechanism is operated according to the two-cycle timing of the second cylinder 1-2. Therefore, the two-cycle cylinder intake valve 13-1 has the same structure as the intake valves of typical four-cylinder engines. However, the two-cycle cylinder exhaust port 16 is arranged to be directed upward of the cylinder block 1 from the side of the second cylinder 1-2, thereby discharging the exhaust gas from the lower side of the second cylinder 1-2.

The second type two-cycle cylinder valve mechanism includes the two-cycle cylinder intake valve 13-1 which is opened and closed by the two-cycle cam 11-2 of the camshaft 11 within the cylinder head 10, and the two-cycle cylinder exhaust valve 15-1. The second type two-cycle cylinder valve mechanism is operated according to the two-cycle timing of the second cylinder 1-2. Therefore, the two-cycle cylinder intake/exhaust valves 13-1 and 15-1 have the same structure as the intake/exhaust valves of typical four-cylinder engines.

FIGS. 7A to 7C illustrate differences between the strokes of the first and third cylinders 1-1 and 1-3, in which four-cycle combustion is controlled, and the stroke of the second cylinder 1-2 in which two-cycle combustion is controlled.

A bottom dead center (BDC) of second cylinder 1-2 is relatively lower than those of the first and third cylinders 1-1 and 1-3, under conditions in which a top dead center (TDC) of the second cylinder 1-2 is the same as those of the first and third cylinders 1-1 and 1-3. Thus, the stroke s-2 of the second cylinder 1-2 is shorter than the strokes s-1 of the first and third cylinders 1-1 and 1-3. As a result, the valve timing of the second cylinder 1-2 differs from the valve timings of the first and third cylinders 1-1 and 1-3, and thus the almost same power can be generated, and noise, vibration, and harshness (NVH) can be improved.

Figure 8A:
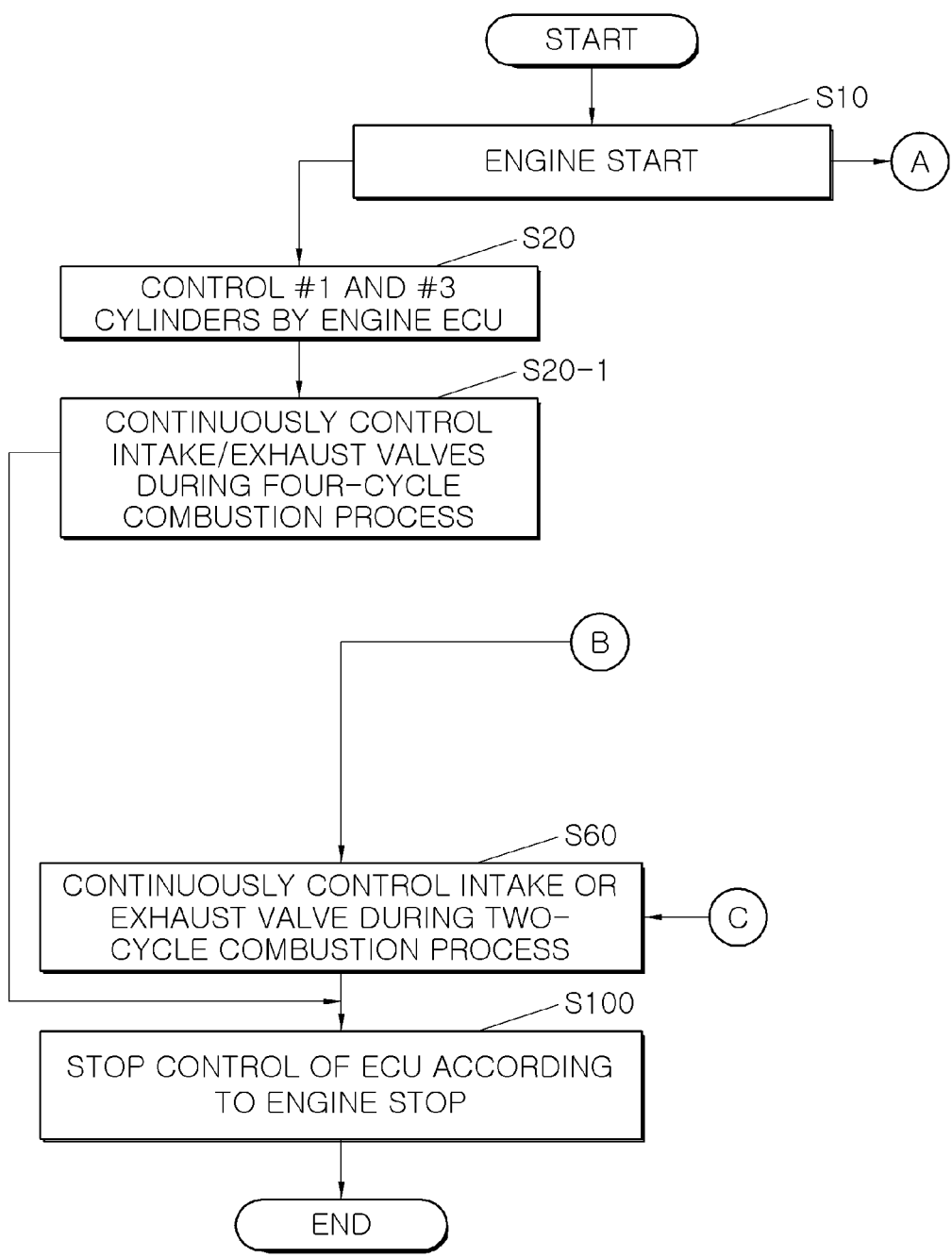
FIGS. 8A and 8B are a flowchart illustrating control of the combined-cycle combustion control type three-cylinder engine according to the embodiment of the present invention.
Figure 8B:
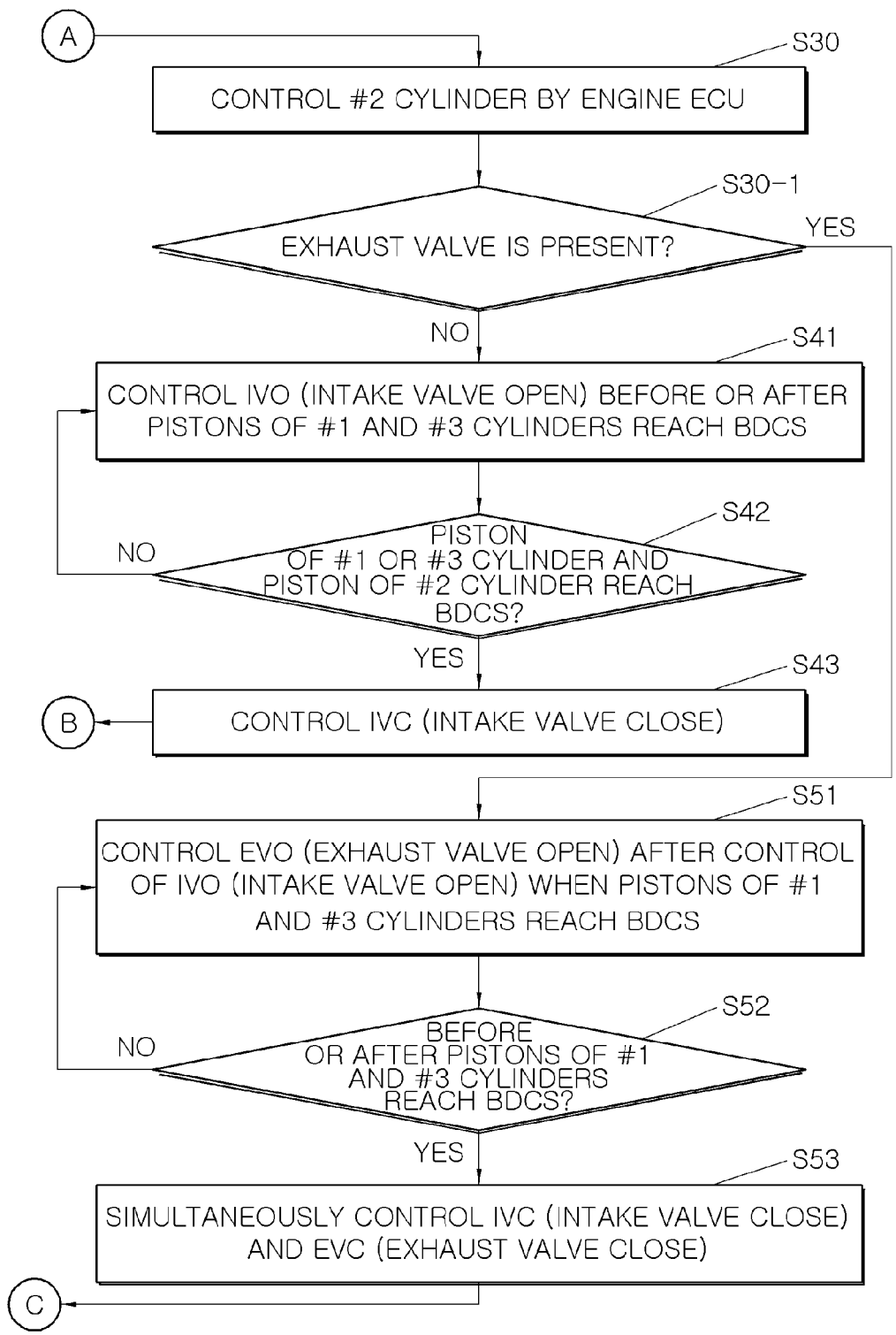

FIGS. 8A and 8B are flowcharts illustrating a control of the combined-cycle combustion control type three-cylinder engine according to an embodiment. The control described below is performed by the controller 20, and the controller 20 will be described to be an engine ECU.

Reference numeral S10 refers to a state in which the engine is ignited. Then, the engine ECU recognizes the engine ignition by key on (or ignition switch on), and divides the first, second, and third cylinders 1-1, 1-2, and 1-3 into the first and third cylinders 1-1 at step S20 and 1-3 and the second cylinder 1-2 at step S30. Therefore, the three-cycle engine is operated by combustion in the combined four- and two-cycle.

In step S20-1, combustion in the first and third cylinders 1-1 and 1-3 is controlled according to four-cycle timings. In this case, the four-cycle cylinder intake valve 13 and the four-cycle cylinder exhaust valve 15, which are respectively provided in the first and third cylinders 1-1 and 1-3, are operated according to the four-cycle timings. Step S20-1 continues during the four-cycle combustion process, and stops by discontinuing the control of the engine ECU according to the stop of the engine. Therefore, the four-cycle cylinder intake/exhaust valves 13 and 15 are operated similar to the intake/exhaust valves of typical four-cycle engines, and the engine ECU is controlled similar to the ECUs of typical four-cycle engines.

In step S30-1, the engine ECU determines whether or not the two-cycle cylinder exhaust port 16 is present before the combustion in the second cylinder 1-2 is controlled according to the two-cycle timing. This step may be omitted when the engine ECU previously recognizes the second cylinder 1-2 having the two-cycle cylinder exhaust port 16 or the second cylinder 1-2 having the two-cycle cylinder exhaust valve 15-1. Consequently, the process for the second cylinder 1-2 may proceed to steps S41, S42, S43, and S60 immediately after step S30, or may proceed to steps S51, S52, S53, and S60 immediately after step S30.

Each of steps S41, S42, and S43 is an example in which the intake/exhaust valve timings of the second cylinder 1-2 having the two-cycle cylinder intake valve 13-1 and the two-cycle cylinder exhaust port 16 are controlled by the engine ECU.

The engine ECU performs an intake valve open (IVO) control before or after the pistons of #1 and #3 cylinders reach BDCs as in step S41, and then performs an intake valve close (IVC) control as in step S43 when the piston of #1 cylinder or #3 cylinder, and the piston of #2 cylinder reach BDCs as in step S42. This step continues during the two-cycle combustion process as in step S60, and step S60 is stopped by discontinuing the control of the engine ECU according to the stop of the engine as in step S100. Here, #1 cylinder means the first cylinder 1-1, #2 cylinder means the second cylinder 1-2, #3 cylinder means the third cylinder 1-3, and the IVO and IVC mean the opening and closing of the two-cycle cylinder intake valve 13-1.

FIG. 9 illustrates an example in which each of steps S41, S42, and S43 is applied to the second cylinder 1-2 having the two-cycle cylinder intake valve 13-1 and the two-cycle cylinder exhaust port 16.

In the intake/exhaust cycle of the second cylinder 1-2, the two-cycle cylinder intake valve 13-1 is opened, before or after the piston of the first or third cylinder 1-1 or 1-3 reaches the BDC, to be changed to an IVO state, and thus, intake begins in the second cylinder 1-2. Then, the two-cycle cylinder exhaust port 16 is opened when the second piston 3-2 is close to the BDC, and thus, the exhaust begins. That is, in the second cylinder 1-2, the exhaust begins after the intake is performed.

Next, the opened states of the two-cycle cylinder intake valve 13-1 and the two-cycle cylinder exhaust port 16 are maintained while the piston of the first or third cylinder 1-1 or 1-3 and the piston of the second cylinder 1-2 are kept at the BDCs. Thereafter, the two-cycle cylinder exhaust port 16 begins to be closed when the second piston 3-2 is close to the BDC of the first or third cylinder 1-1 or 1-3, and thus the two-cycle cylinder intake valve 13-1 is changed to an IVC state.

Each of steps S51, S52, and S53 refers to an example in which intake/exhaust valve timings of the second cylinder 1-2 having the two-cycle cylinder intake valve 13-1 and the two-cycle cylinder exhaust valve 15-1 are controlled by the engine ECU.

The engine ECU performs an exhaust valve open (EVO) control after the IVO control when the pistons of #1 and #3 cylinders reach the BDCs as in step S51, and then simultaneously performs the IVC control and an exhaust valve close (EVC) control as in step S53 before or after the piston of #1 cylinder or #3 cylinder reaches the BDC as in step S52. This step continues during the two-cycle combustion process as in step S60, and step S60 is stopped by discontinuing the control of the engine ECU according to the stop of the engine as in step S100. Here, the EVO and EVC mean the opening and closing of the two-cycle cylinder exhaust valve 15-1.

Figure 10:
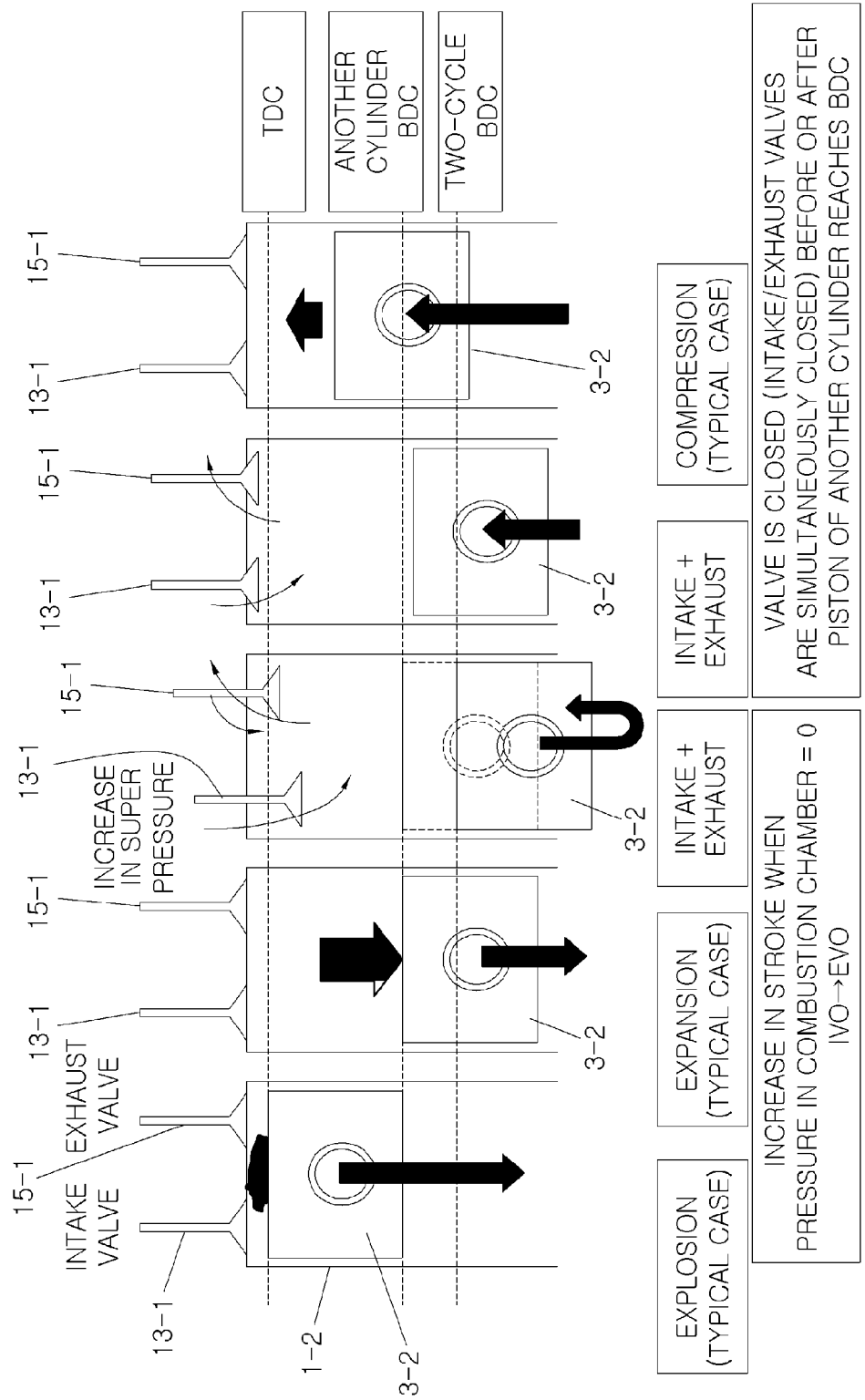
FIG. 10 is a diagram illustrating a state of intake/exhaust operation during combustion in a second type two-cycle cylinder according to the embodiment of the present invention.

FIG. 10 illustrates an example in which each of steps S51, S52, and S53 is applied to the second cylinder 1-2 having the two-cycle cylinder intake valve 13-1 and the two-cycle cylinder exhaust valve 15-1.

As illustrated in the drawing, in the intake/exhaust cycle of the second cylinder 1-2, the two-cycle cylinder intake valve 13-1 is opened, when the piston of the first or third cylinder 1-1 or 1-3 reaches the BDC, to be changed to an IVO state, and thus intake begins in the second cylinder 1-2. Then, after the IVO of the two-cycle cylinder intake valve 13-1, the two-cycle cylinder exhaust valve 15-1 is opened to be changed to be an EVO state, and thus exhaust begins together in the second cylinder 1-2. Next, the opened states of the two-cycle cylinder intake valve 13-1 and the two-cycle cylinder exhaust valve 15-1 are maintained until the piston of the first or third cylinder 1-1 or 1-3 reaches the BDC. Thereafter, the two-cycle cylinder intake valve 13-1 and the two-cycle cylinder exhaust valve 15-1 are simultaneously closed when the piston of the first or third cylinder 1-1 or 1-3 reaches the BDC, so that the two-cycle cylinder intake valve 13-1 is changed to an IVC state and at the same time the two-cycle cylinder exhaust valve 15-1 is changed to be an EVC state.

FIG. 11 is a diagram illustrating a combined-cycle combustion timing during four- and two-cycle combustion of the three-cylinder engine according to an embodiment.

The three-cylinder engine is operated such that four-cycle combustion and two-cycle combustion are controlled in a combined manner by the engine ECU. As a result, the compression/explosion in the first cylinder 1-1 and the compression/explosion in the second cylinder 1-2 after the exhaust/intake in the third cylinder 1-3 are performed, and the compression/explosion in the third cylinder 1-3 and the compression/explosion in the second cylinder 1-2 after the exhaust/intake in the first cylinder 1-1 are performed.

Therefore, since the compression/explosion in the second cylinder 1-2 is generated during the exhaust/intake in the first and third cylinders 1-1 and 1-3, the respective cycles of the second cylinder 1-2 and the first and third cylinders 1-1 and 1-3 are continuously performed according to different valve timings. Particular, the power of the second cylinder 1-2 is almost equal to the power of the first and third cylinders 1-1 and 1-3 since the second cylinder 1-2 has a shorter stroke than the first and third cylinders 1-1 and 1-3, so that the three-cylinder engine can have increased power and improved NVH.

As described above, the combined-cycle combustion control type three-cylinder engine according to the embodiment includes the cylinder block 1 having the first, second, and third cylinders 1-1, 1-2, and 1-3 in which combustion is performed, the crankshaft 5 which forms a difference in stroke of the first, second, and third pistons 3-1, 3-2, and 3-3 provided in the respective first, second, and third cylinders 1-1, 1-2, and 1-3, and the camshaft 11 which receives the rotational force of the crankshaft 5 to form the intake and exhaust timings for each of the first, second, and third cylinders 1-1, 1-2, and 1-3. Accordingly, the four-cycle combustion in the first and third cylinders 1-1 and 1-3 is controlled by the controller 20, and the two-cycle combustion in the second cylinder 1-2 is controlled by the controller 20. Therefore, it is possible to prevent engine performance (power and torque) from deteriorating even when the combined four- and two-cycle combustion is performed. Particularly, the advantages of existing three-cylinder engines, such as a compact structure and high fuel efficiency, are maintained, and NVH is further improved.

In accordance with the exemplary embodiments, the three-cylinder engine can improve NVH to the level of four-cylinder engines, while a compact structure, a reduction in weight, and an improvement in fuel efficiency are maintained.

In addition, the three-cylinder engine of the present disclosure can improve engine performance (power and torque) at a higher level than existing three-cylinder engines and to a level closed to four-cylinder engines, while being controlled under a combined four and two cycle.

While the present disclosure has been described with respect to the specific embodiments, it will be apparent to those skilled in the art that various changes and modifications may be made without departing from the spirit and scope of the invention as defined in the following claims.

What is claimed is:

1. A combined-cycle combustion control type three-cylinder engine comprising:
   a cylinder block;
   cylinders arranged in a row in the cylinder block and consisting of first, second, and third cylinders so that four-cycle combustion is performed in two of the first, second, and third cylinders and two-cycle combustion is performed in the remaining cylinder;
   a crankshaft connected to first, second, and third pistons and rotating by reciprocating motions of the respective first, second, and third cylinders; and
   a camshaft receiving a rotational force from the crankshaft to control intake and exhaust timings for each of the first, second, and third cylinders,
   wherein the camshaft comprises two four-cycle cams for controlling the intake and exhaust timings of the first and third cylinders, and one two-cycle cam for controlling the intake and exhaust timings of the second cylinder; and
   the two-cycle cam has an elliptical shape and is bilaterally symmetrical about an axis of rotation of the camshaft.

2. The combined-cycle combustion control type three-cylinder engine of claim 1, wherein the second cylinder is disposed between the first and third cylinders.

3. The combined-cycle combustion control type three-cylinder engine of claim 1, wherein the four-cycle combustion is performed in each of the first and third cylinders, and the two-cycle combustion is performed in the second cylinder.

4. The combined-cycle combustion control type three-cylinder engine of claim 3, wherein:

the second piston provided in the second cylinder has a stroke shorter than a stroke of the first piston provided in the first cylinder and a stroke of the third piston provided in the third cylinder;

the first, second, and third pistons are respectively coupled to first, second, and third crankpin journals of the crankshaft;

a main journal of the crankshaft comprises first, second, and third counter weights which are arranged at intervals, the first, second, and third counter weights have the first, second, and third crankpin journals, respectively, and the second crankpin journal is formed at a higher position than the first and third crankpin journals with respect to an axis of rotation of the main journal; and the first, second, and third pistons have different strokes due to a difference in height between the respective first, second, and third crankpin journals.

5. The combined-cycle combustion control type three-cylinder engine of claim 4, wherein the first crankpin journal and the third crankpin journal have the same height.

6. The combined-cycle combustion control type three-cylinder engine of claim 1, wherein:

each of the first and third cylinders comprises a four-cycle cylinder intake valve and a four-cycle cylinder exhaust valve, timings of which are controlled by each of the four-cycle cams; and the second cylinder comprises a two-cycle cylinder intake valve, a timing of which is controlled by the two-cycle cam, and a two-cycle cylinder exhaust port, a timing of which is controlled by downward movement of the second piston.

7. The combined-cycle combustion control type three-cylinder engine of claim 6, wherein the two-cycle cylinder exhaust port communicates with an inner portion of a combustion chamber of the second cylinder at a side of the second cylinder.

8. The combined-cycle combustion control type three-cylinder engine of claim 1, wherein:

each of the first and third cylinders comprises a four-cycle cylinder intake valve and a four-cycle cylinder exhaust valve, timings of which are controlled by each of the four-cycle cams; and the second cylinder comprises a two-cycle cylinder intake valve and a two-cycle cylinder exhaust valve, timings of which are controlled by the two-cycle cam.

9. The combined-cycle combustion control type three-cylinder engine of claim 1, wherein the camshaft is combined with a variable valve system.

10. The combined-cycle combustion control type three-cylinder engine of claim 1, wherein the four-cycle combustion and the two-cycle combustion are controlled by a controller, and the controller forms intake and exhaust timings for the two-cycle combustion using bottom dead centers (BDCs) detected by the respective first, second, and third pistons.

11. The combined-cycle combustion control type three-cylinder engine of claim 10, wherein the controller is an engine electronic control unit (ECU).

12. A method for controlling a combined-cycle combustion control type three-cylinder engine, comprising:

performing combined-cycle combustion consisting of four-cycle combustion performed in first and third cylinders of first, second, and third cylinders, and two-cycle combustion performed in the second cylinder, when an engine ECU recognizes ignition of the engine; and performing combined-cycle combustion control in which, when the engine ECU controls the four-cycle combustion in the first and third cylinders and the two-cycle combustion in the second cylinder, intake valve open (IVO) of the second cylinder is controlled before or after a piston of the first or third cylinder reaches a BDC, and intake valve close (IVC) of the second cylinder is controlled when the piston of the first or third cylinder reaches the BDC.

13. The method of claim 12, wherein the engine ECU controls compression and explosion in the first cylinder or exhaust and intake in the third cylinder, compression and explosion in the second cylinder, compression and explosion in the third cylinder or exhaust and intake in the first cylinder, and the compression and explosion in the second cylinder, in this order.

14. The method of claim 12, wherein the second cylinder comprises: a two-cycle cylinder intake valve in which the IVO control and the IVC control are performed; and a two-cycle cylinder exhaust port which is opened when a piston of the second cylinder is close to a BDC and which is closed when the piston the second cylinder is close to the BDC of the first or third cylinder.

15. A method of controlling a combined-cycle combustion control type three-cylinder engine, comprising:

performing combined-cycle combustion consisting of four-cycle combustion performed in first and third cylinders of first, second, and third cylinders, and two-cycle combustion performed in the second cylinder, when an engine ECU recognizes ignition of the engine; and performing combined-cycle combustion control in which, when the engine ECU controls the four-cycle combustion in the first and third cylinders and the two-cycle combustion in the second cylinder, IVO of the second cylinder is controlled when a piston of the first or third cylinder reaches a BDC, exhaust valve open (EVO) of the second cylinder is controlled after the control of the IVO, and IVC and exhaust valve close (EVC) of the second cylinder are simultaneously controlled before or after the piston of the first or third cylinder reaches the BDC.

16. The method of claim 15, wherein the engine ECU controls in the order of compression and explosion in the first cylinder or exhaust and intake in the third cylinder, compression and explosion in the second cylinder, compression and explosion in the third cylinder or exhaust and intake in the first cylinder, and the compression and explosion in the second cylinder.

17. The method of claim 15, wherein the second cylinder comprises a two-cycle cylinder intake valve in which the IVO control and the IVC control are performed, and a two-cycle cylinder exhaust valve in which the EVO control and the EVC control are performed.

18. A method of controlling a combined-cycle combustion control type three-cylinder engine, comprising:

performing combined-cycle combustion consisting of four-cycle combustion performed in first and third cylinders of first, second, and third cylinders, and two-cycle combustion performed in the second cylinder, when an engine ECU recognizes ignition of the engine;

performing two-cycle cylinder determination in which the engine ECU determines whether the second cylinder has a two-cycle cylinder exhaust valve;

performing first type combined-cycle combustion control in which, when the engine ECU controls the four-cycle combustion in the first and third cylinders and the two-cycle combustion in the second cylinder without having the two-cycle cylinder exhaust valve, IVO of the second cylinder is controlled before or after a piston of the first or third cylinder reaches a BDC, and IVC of the second cylinder is controlled when the piston of the first or third cylinder reaches the BDC; and performing second type combined-cycle combustion control in which, when the engine ECU controls the four-cycle combustion in the first and third cylinders and the two-cycle combustion in the second cylinder having the two-cycle cylinder exhaust valve, IVO of the second cylinder is controlled when a piston of the first or third cylinder reaches a BDC, EVO of the second cylinder is controlled after the control of the IVO, and IVC and EVC of the second cylinder are simultaneously controlled before or after the piston of the first or third cylinder reaches the BDC.

* * * * *